(No Model.) 5 Sheets—Sheet 3.

I. R. KERN.
ROTARY ENGINE.

No. 556,354. Patented Mar. 17, 1896.

Witnesses:

Inventor
Isaac R. Kern.

(No Model.)

I. R. KERN.
ROTARY ENGINE.

No. 556,354. Patented Mar. 17, 1896.

Witnesses:
P. G. Fischer
G. W. Thorpe

Inventor
Isaac R. Kern.
By Higdon & Higdon
Attys.

(No Model.) 5 Sheets—Sheet 5.
I. R. KERN.
ROTARY ENGINE.
No. 556,354. Patented Mar. 17, 1896.
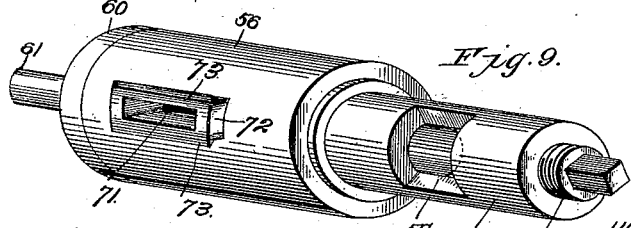
Fig. 9.
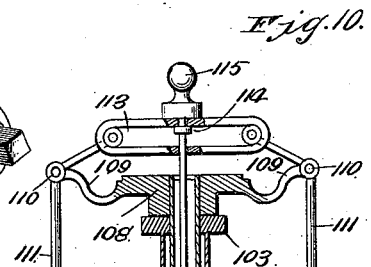
Fig. 10.
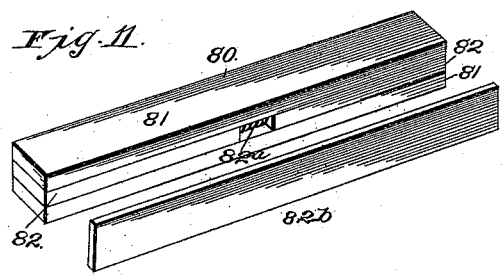
Fig. 11.
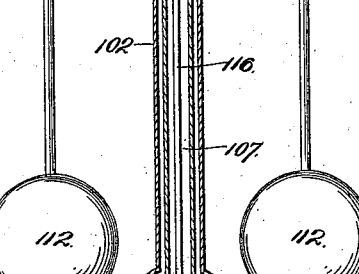
Fig. 12.
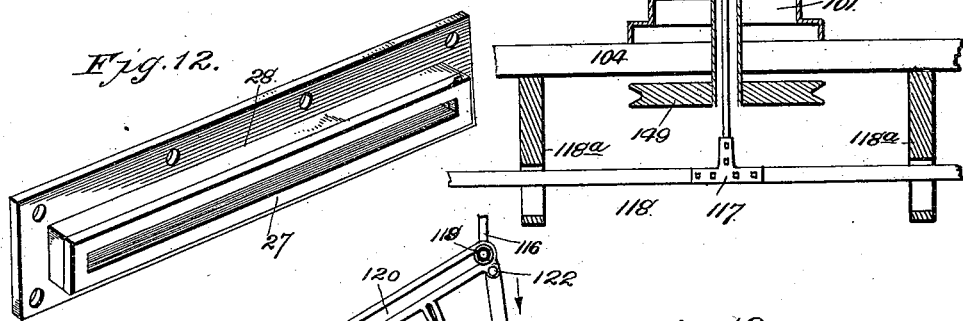
Fig. 13.
Witnesses: 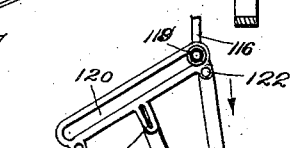
F. G. Fischer
G. Y. Thorpe
Inventor
Isaac R. Kern,
By Higdon & Higdon
Attys.

UNITED STATES PATENT OFFICE.

ISAAC R. KERN, OF KANSAS CITY, MISSOURI.

ROTARY ENGINE.

SPECIFICATION forming part of Letters Patent No. 556,354, dated March 17, 1896.

Application filed July 11, 1895. Serial No. 555,596. (No model.)

*To all whom it may concern:*

Be it known that I, ISAAC R. KERN, of Kansas City, Jackson county, Missouri, have invented certain new and useful Improvements in Rotary Engines, of which the following is a full, clear, and exact description, reference being had to the accompanying drawings, forming a part thereof.

My invention relates to rotary steam-engines.

The object of the invention is to provide in a rotary engine, a construction whereby the governor automatically controls the valves that the quantity of steam supplied to drive the piston-wheel shall vary directly as the load or work to be done is lightened or increased—that is, like a Corliss reciprocatory engine, the volume of steam admitted to the cylinder depends upon the position of the governor-balls, and the speed of the engine is regulated by the variations in the quantity of steam thus admitted.

A further object is to provide an engine which combines simplicity, strength, and durability of construction.

With these objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1:
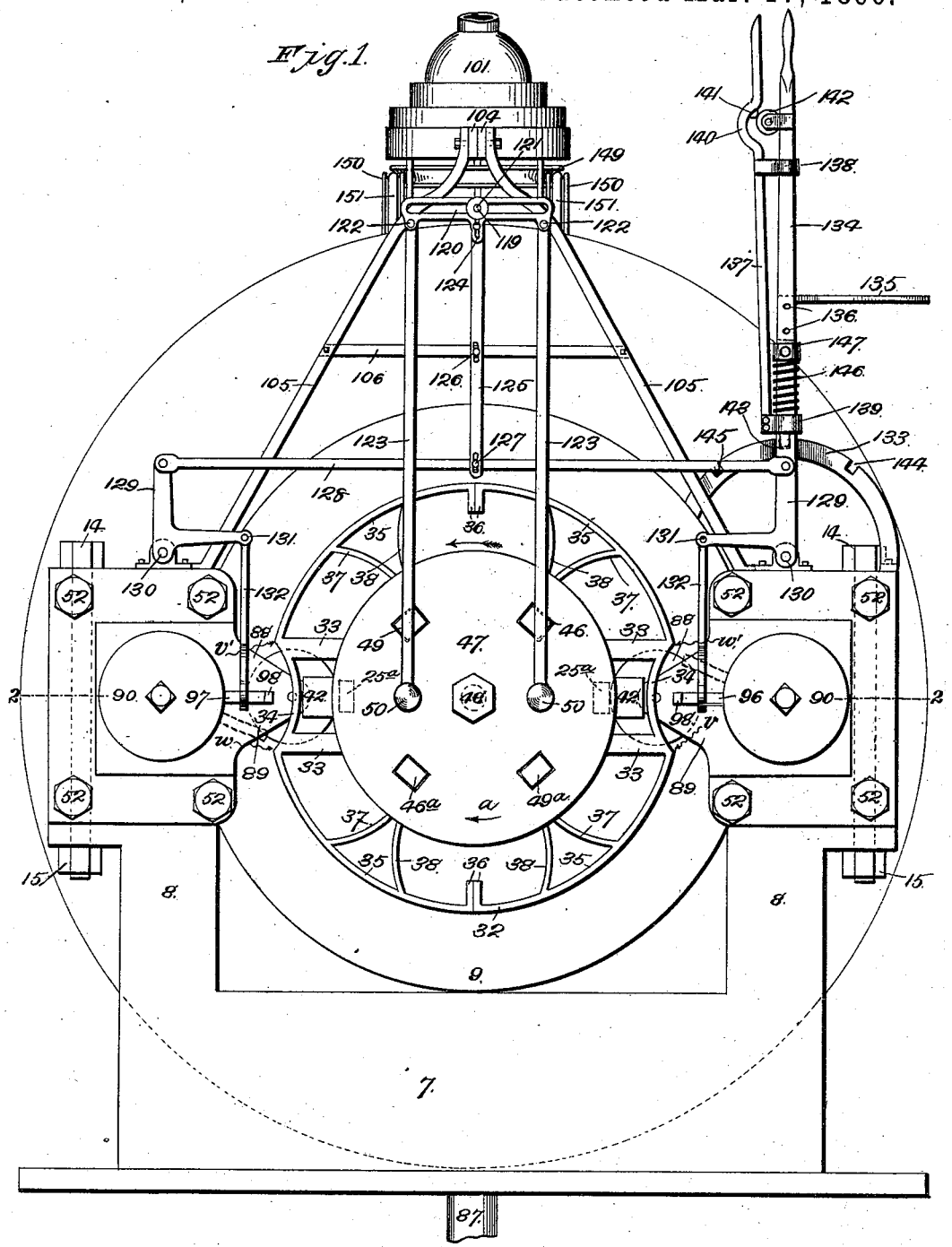
Figure 2:
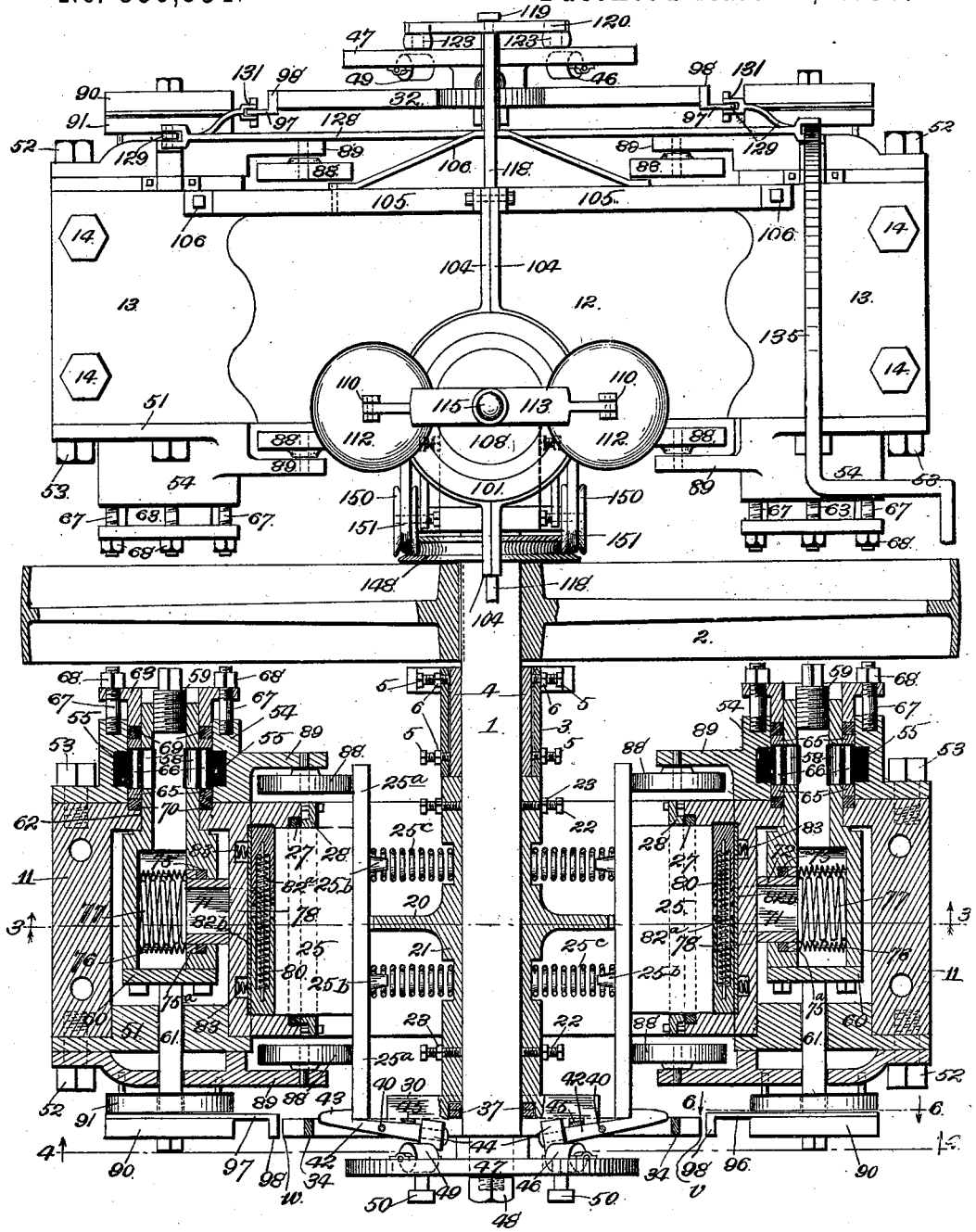
Figure 3:
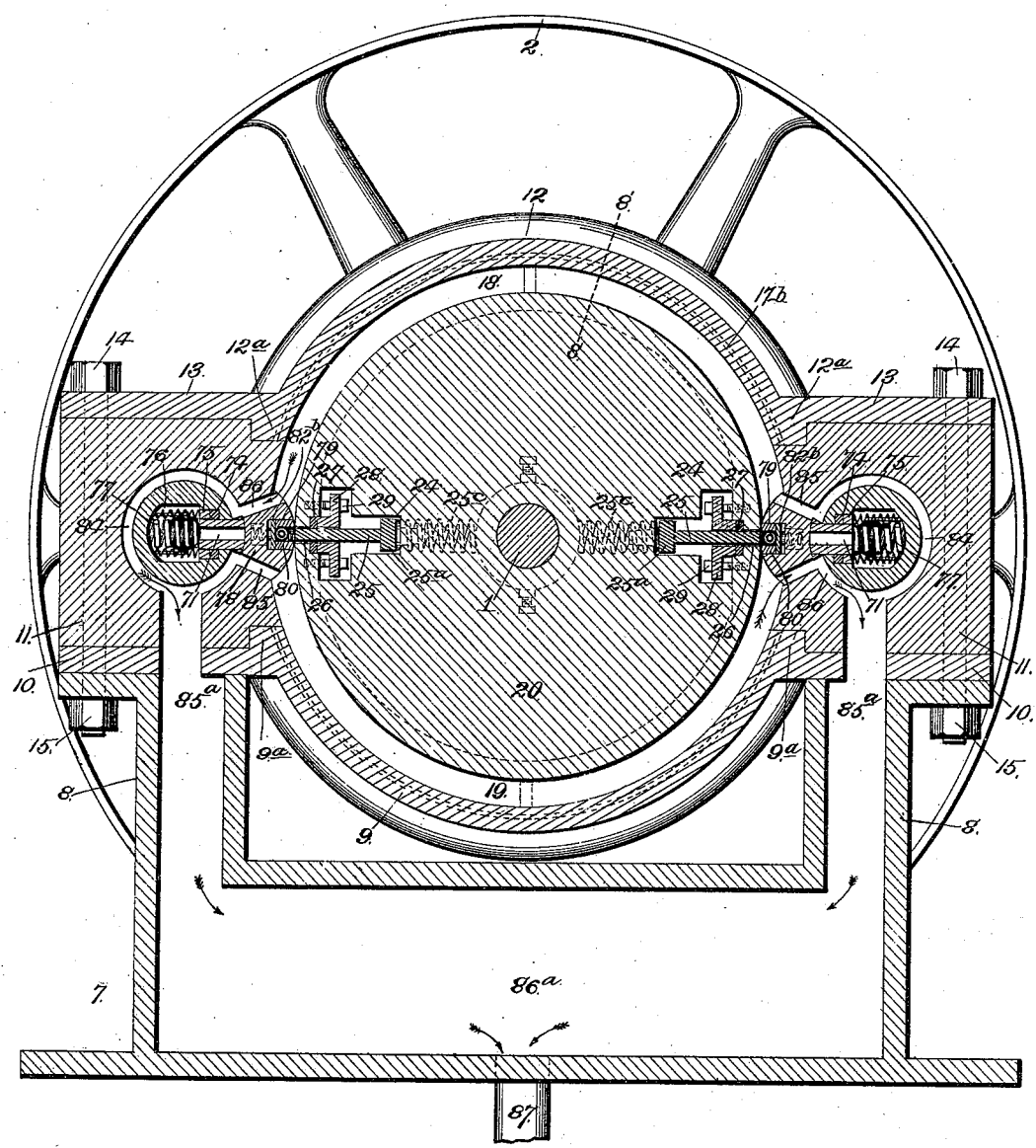
Figure 4:
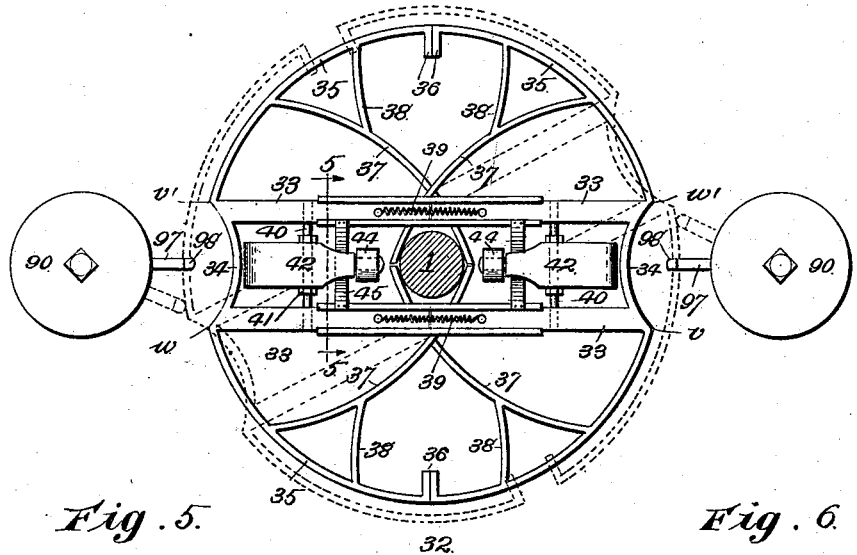
Figure 5:
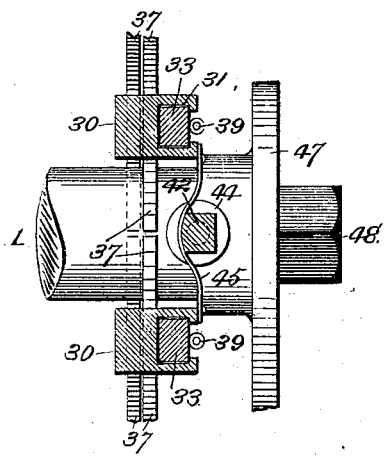
Figure 6:
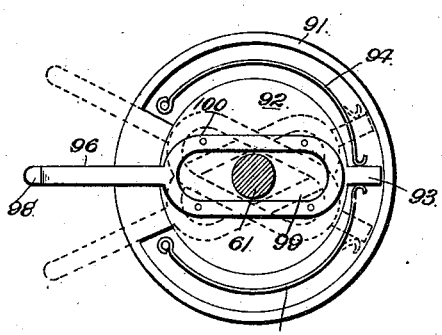
Figure 7:
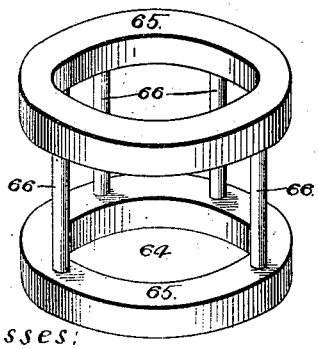
Figure 8:
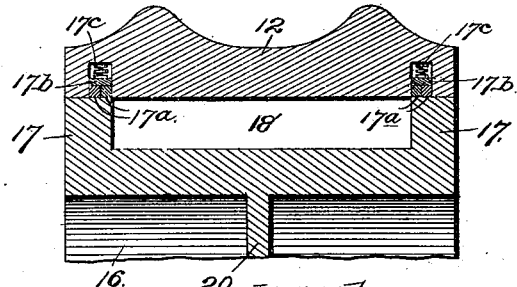

Figure 1 represents an end view of a rotary engine embodying my invention. Fig. 2 represents a view, partly in horizontal section and partly in top plan, on the line 2 2 of Fig. 1. Fig. 3 represents a vertical section taken on the line 3 3 of Fig. 2. Fig. 4 represents a sectional view taken on the line 4 4 of Fig. 2, to show more clearly the detail construction of the expansible wheel and its relation to the valves. Fig. 5 is a section, on an enlarged scale, taken on the line 5 5 of Fig. 4. Fig. 6 is a sectional view, on an enlarged scale, taken on the line 6 6 of Fig. 2. Fig. 7 is a perspective view, enlarged, of one of the thimbles used in the construction of the engine. Fig. 8 is a sectional view, enlarged, taken on the line 8 8 of Fig. 3. Fig. 9 is a perspective view, enlarged, of one of the balanced pivot-valves used in the engine. Fig. 10 is a sectional view showing the construction of the governor. Fig. 11 is a detail perspective view of one of the packings which are employed to divide the cylinder-passage into two separate and independent channels. Fig. 12 is a detail perspective view, enlarged, of a packing-box employed in the engine. Fig. 13 is a view illustrating one of the oscillatory disks, one of the tilting links, and the connecting-bars in a position different from that shown in Fig. 1.

In the said drawings, where similar numerals refer to corresponding parts throughout the several views, 1 designates a shaft, upon which at its middle is keyed rigidly the belt-wheel 2. Said shaft extends through bearing-boxes 3, mounted at opposite sides of said belt-wheel (one only of which is shown) and is journaled in follower-plates 4 carried by said boxings. Said follower-plates 4 are adjusted to accommodate wear, or for any other purpose, by the screws 5, which are set or fixed at any desired point by the lock-nuts 6.

7 designates the base of the engine, which may be of the rectangular form shown, or of any other desired or preferred configuration, and at its opposite sides said base is provided with the upward extensions 8.

9 designates the lower portion of the engine-casing. Said portion is segmental in cross-section and terminates short of a semicircle, and is provided at its upper ends in the same horizontal plane, preferably, with the outwardly-projecting arms 10 and with the longitudinal shoulders 9ª at the junction of the portion 9 with the arms 10. It is also arranged concentrically of the axis of the shaft 1. Resting upon the arms 10 of the lower portion of the casing and projecting equal distances above and below the horizontal plane of the axis of the portion 9 of the cylinder are the blocks 11, and the inner or opposing faces of the said blocks are segmental and have the same radius from the axis of the shaft as the inner side of the portion 9. The upper portion of the cylinder-casing comprises the segmental portion 12 of the same form and dimensions as the portion 9. Said portion is provided also with outwardly-projecting horizontal arms 13, which rest upon the upper sides of the blocks 11 and with depending shoulders 12ª at the junction of said portion with said arms. The shoulders 9ª and 12ª engage corresponding recesses or cavities in the blocks 11, so as to form a more secure and reliable connection between the blocks 11 and the upper and lower portions of the casing, which are secured firmly together by means of the vertical bolts 14 and the retaining-nuts 15 engaging the threaded ends of the same. Arranged concentrically within said casing and mounted rigidly upon the shaft is the rotary piston, which is constructed as follows:

16 designates a ring or annulus, which is provided at its opposite ends with the outwardly-projecting annular flanges 17. Said flanges bear snugly against the internal surface of the cylindrical casing hereinbefore described, so as to form a space which is divided by the bridge-walls, hereinafter more particularly referred to, into approximately semiannular passages 18 and 19, which are made shallow, as compared with their width. Segmental packing-strips 17ª bear against the peripheries of the flanges 17 and fit in annular grooves in said casing. They are held with a yielding pressure in contact with said flanges by the segmental strip 17ᵇ, (shown in dotted lines, Fig. 3, and in cross-section in Fig. 8,) which in turn are actuated by springs 17ᶜ. This metallic packing will form a perfectly steam-tight joint between the flanges 17 and the inner side of the casing, but may, if found desirable or necessary, be replaced by packings of rubber, leather, or equivalent material. Said packing-strips bear at their opposite ends upon the horizontal shoulders formed by recessing the blocks 11 to receive the shoulders 9ª and 12ª of the segmental portions of the casing.

Arranged centrally of and connecting the ring 16 with the hub or sleeve portion 21 of the plunger, which is mounted upon the shaft at the outer side of the bearing 3, is the web or spoke 20, which may be in the form of a solid plate or disk, as shown in Fig. 3, or in the form of a plural number of spokes. The hub of said plunger is centered and secured rigidly upon said shaft by set-screws 22 and lock-nuts 23, as shown clearly in Fig. 2. Mounted to reciprocate vertically in the T-shaped openings 24 of the web of said piston at diametrically-opposite points in the same are the followers or paddles 25, the outer ends of which engage radial passages 26 in the ring portion 16 of the piston. Each follower or paddle corresponds in width to the passages 18 and 19 and is laterally widened or extended at its inner end to form the oppositely-projecting arms 25ª, which extend parallel with the shaft and in longitudinal alignment with each other, and projecting inwardly from said followers or paddles are the centering-lugs 25ᵇ of the expansive spiral springs 25ᶜ, which at their opposite ends engage cavities in the web 21 of the rotary plunger and tend always to advance or force outward the said followers or paddles.

In order that perfectly tight joints may be formed to prevent steam escaping from either of the passages 18 or 19 by way of the passages 26, I employ the annular packings 27, which embrace the followers or paddles snugly at all sides, (see Figs. 2 and 3,) and said packings are clamped firmly and rigidly in position by means of the rectangular annular boxings 28, which are secured by bolts 29 firmly to the ring 16. (See Fig. 3.) Secured rigidly upon or cast integral with the hub of said rotary piston at its end opposite to or farthest from the bearing 3, and above and below the shaft in planes parallel with the plane of the followers or paddles 25, are the bars 30. These bars are grooved in their outer sides, as shown at 31, to form depending and upwardly-projecting flanges. Mounted in said grooved bars is an expansible and contractible valve-operating wheel 32. Said wheel is constructed of spring-steel, and consists of two similar sections, each comprising a pair of parallel portions 33, which are connected at their outer ends by the curved bridge portions 34, the oppositely-extending portions 35, which preferably curve from the same center, which is at a point equally distant from the inner ends of said portions 33, and extend for nearly a quarter of a circle, and terminate in the inwardly-projecting radial ends or shoulders 36. Each section also comprises a pair of curved arms 37, which branch from the portions 35, and when the wheel is in its retracted position are about in contact at their inner ends, and said arms are also connected with the portions 35 at a suitable distance from the shoulders 36 by the braces 38. When the two sections are put together to form a complete wheel, the inner ends of the bars 33 fit within the grooves 31 of the bars 30, and they are held yieldingly together and with their shoulders 36 in contact by the springs 39, except when expanded by an overcoming force.

The curved arms 37 of one section overlap the curved arms of the other section, and the free ends of said arms bear with a yielding pressure against the opposite sides of the shaft 1, and also extend loosely through elongated openings or slots. (Shown in full lines, Fig. 2, and in dotted lines, Fig. 5, in the parallel guide-bars 30.) Connecting the parallel bars 33 of each section outward of the ends of said guide-bars are the rods 40, and mounted pivotally upon the same and between the shoulders or nuts 41 carried thereby are dogs or hooks 42, the teeth 43 of which are at their outer ends and are inwardly disposed. Mounted upon the inner ends of said dogs are antifriction-rollers 44. The toothed ends of said dogs are normally held inward with a yielding pressure by means of the springs 45, carried by and connecting the said guide-bars, as shown clearly in Figs. 4 and 5; but at times said dogs are adapted to be thrown out of engagement with said arms 25ª of the followers or paddles 25 by the companion trip-rollers 46 and 46ª, which are mounted at diametrically-opposite points in the oscillatory disk 47, secured loosely upon the reduced end of the shaft 1 by the retaining-nut 48, or by the companion trip-rollers 49 and 49ª, which are also mounted at diametrically-opposite points in said disk 47 and at right angles to the trip-rollers 46 and 46ª, as shown clearly in Fig. 1. It is preferred that the plane represented by each of said companion pairs of trip-rollers shall extend at an angle of forty-five degrees to the plane represented by the dogs 42. At equal distances from the rollers 46ª and 49 at one side of the shaft and 46 and 49ª at the opposite side of the shaft wrist or pivot pins 50 project outwardly from the oscillatory disk 47.

Each block 11 is provided with a cylindrical cavity or recess, and said cavity or recess is closed at one end by the removable cap 51, which is secured in place by bolts 52. At the opposite end of said block is secured by bolts 53 a casting 54, which is provided with an opening or openings 55, connected to the steam-supply pipe (not shown) and journaled to rock or oscillate in the cavity in said block 11, and in the cavity in said casting 54 is what I term a "balanced pivot-valve," constructed as follows:

56 designates the cylindrical portion or barrel, which is hollow, and at one end is diminished diametrically to form the elongated tubular stem 57, provided about midway its length at opposite sides with inlet openings or ports 58. The end of said tubular stem is preferably closed by a screw-plug 59, while the opposite end of the valve is closed preferably by the cap 60, provided axially with the outwardly-projecting stem 61. In operative position the portion 56 of said valve occupies the enlarged portion of the cavity of the block 11, while the stem 57 at opposite sides of the inlet-ports 58 is journaled in the opening 62 in the end of the block 11 and in the boxing 63. Said stem is also journaled in the thimble or spider-frame 64, which consists of the rings 65 and the rods 66 connecting the same. The opposing faces of the rings 65 of said thimble preferably are flush with the opposite ends of the ports 58, and to insure a perfectly steam-tight joint between the said stem and the block 11 and casting 54 and between said stem and the boxing 63 I employ the threaded stems 67, which project from the end of said casting through said boxing and are engaged by clamping-nuts 68, whereby said boxing 63 may be adjusted to bear with more or less pressure upon the packing-ring 69 interposed between said boxing and the thimble, and consequently with more or less pressure upon the packing-ring 70 interposed between the thimble and the block 11, as shown clearly in Fig. 2. The stem 61, projecting from the opposite end of the valve, is journaled in the cap 51, and carries upon its outer end mechanism which will be hereinafter described.

The body portion 56 of the valve is provided with a discharge-port 71, which is formed by inserting in an opening of the same a rectangular tube 72, and said tube is flanged or lipped at its upper and lower sides, as shown at 73, for a purpose which will hereinafter be explained. Said tube is surrounded by an annular packing 74 and an annulus 75, and a perfectly steam-tight joint is insured between the tube 72 and the opening of the valve in which it fits by means of the springs 76, which exert a constant pressure against the metallic annulus 75, which surrounds the tube and bears against the annular packing 74, as shown clearly in Fig. 2. An expansion-spring 77 also exerts its pressure to hold the outlet-port tube 72 advanced at all times, and said tube at its front end, when the engine is "dead" or at rest, is held against the concave rear or outer side of the bridge 78, which bridge has its front or inner side convex and extending parallel or approximately so to its concave surface. Said bridge also protrudes nearly to the periphery of the ring 16, so as to divide the space between the same and the cylindrical casing into two separate and distinct passages, as hereinbefore referred to. It is essential in the practical operation of the engine that the joint between said bridge and said ring be steam-tight. Therefore it is formed in its convex face and for its full width with the cavity 79, in which is mounted a packing 80, which I will now proceed to describe.

81 designates the top and bottom plates, which fit snugly against the upper and lower walls of said cavity, so that steam is denied access between either of said plates and the wall against which it fits, and 82 designates a pair of similar plates, which are interposed snugly between the plates 81, and said plates 82 are held apart with a yielding pressure by means of an expansion-spring 82ª, so that perfectly steam-tight joints between the outer ends of said plates and the end walls of the cavity in which the packing is seated are provided. These plates are ground and fitted together in the ordinary manner, and the inwardly-disposed edges of the top and bottom plates 81 and also the middle plates 82 fit snugly and squarely against and are held firmly in contact with the periphery of the ring 16 of the rotary plunger by means of the plate 82ᵇ, bearing against their outer or opposite edges and actuated in turn by the expansion-springs 83, so that it is impossible for steam to pass from the chamber 18 to the chamber 19, or vice versa.

The portion 56 of the valve is diametrically smaller than the cavity in which said portion fits, so as to form a circular passage 84, which communicates at its opposite ends with the ports 85 and 86, which diverge inwardly at opposite sides of the bridge portion 78. Said circular steam-passage 84 also communicates with the vertical registering passages 85ª in the block 11, the portion 9 of the cylinder-casing, and the leg 8 of the base 7, and said vertical passage communicates or opens into at its lower end the horizontal passage 86ª, with which communicates the discharge or waste pipe 87 for steam.

The foregoing description of the construction of the valve, its companion parts, and of the various steam-passages, and also of the packing 80 and the bridge carrying the same, is duplicated at the opposite side of the shaft 1, except that the port 85 at one side communicates with one of the passages or channels, while the port 85 at the other side communicates with the other passage or channel, and the same is true as regards the ports 86, one of them communicating with one of said passages or channels while the other communicates with the other passage or channel, as shown clearly in Fig. 3. The vertical discharge-passages 85ª of the valve at said opposite side of the shaft also communicates with or opens into the passage 86ª, from which the steam escapes by way of the pipe 87. When the engine is dead or not in operation, the spring-actuated followers or paddles 25 are in contact with the packings 80, and the discharge-ports 71 of the valve are in alignment and closed at their outer ends by the rear or outer faces of the bridges 78. To permit the followers or paddles to snugly follow the convex faces of the bridges without undue friction I provide the cam-rollers 88. These cam-rollers are mounted upon arms 89, which may be secured to or form a part of the framework and are struck from the same radius as the convex faces of the bridges, being located, however, inward of said bridges a distance sufficient to cause the outwardly-projecting arms or extensions 25ª of the followers or paddles to contact with them at the same time that the outer ends of said followers or paddles come in contact with the bridges. Owing to this arrangement, which is most clearly shown in Fig. 2, it is obvious that the followers or paddles follow closely the convex faces of the bridges without practically any friction, and yet the connection between them may be so close that not a particle of steam can pass from one passage or channel into the other.

Mounted rigidly upon the outer ends of the stems 61 of the valves are the disks or caps 90, and secured inward of said disks or caps to the contiguous arms 89 around said stems are the circular casings 91. Mounted within said casings 91, rigidly upon the stems 61, are the disks 92, which are provided with outwardly-projecting lugs 93, upon the upper and lower sides of which bear with equal pressure the springs 94 and 95, which are secured at their opposite ends to pins projecting from the casing, as shown clearly in Fig. 6. A lever 96 projects inwardly as the stem of one of said valves, and a similar lever 97 projects inwardly from the other valve. Each of said levers comprises a stem or body portion having an arm 98 at its inner end and having a longitudinal slot 99, which embraces its respective valve-stem near the outer end, which slots permit said valves to be longitudinally adjusted by changing the positions of the pins 100, which connect them rigidly with the disks 92.

From reference to Fig. 6, it will be seen that the springs 94 and 95, by bearing upon opposite sides of the lugs 93 of the disks 92, always tend to hold the levers 96 in alignment with the axis of the shaft 1 and with each other, and the valves, therefore, in their inoperative positions, as shown in Fig. 3, and it is also obvious that when said valves are simultaneously oscillated in opposite directions by the movement of the levers up or down below their normal position or plane, the discharge-port 71 of said valves will register with the ports 85, and permit steam to simultaneously enter each passage or channel of the engine, and by impinging upon the opposite sides of the diametrically-opposite followers or paddles, cause the rotation of the piston and of the shaft 1, upon which it is mounted. It is obvious during this operation that the spring-actuated packings 80 are held into frictional engagement with the periphery of the ring portion of the rotary plunger to prevent steam passing from one passage into the other, except when the followers or paddles come into engagement with said packing, so that a perfectly steam-tight joint is provided at all times. It is also obvious that when the discharge-ports of the valves register with the ports 85 of said passages or channels the steam escapes from said passages or channels in the directions indicated by the arrows, Fig. 3, when the engine is running in one direction or that opposite to the direction of travel of the hands of a clock. When the engine is running in the opposite direction, as will be hereinafter more particularly referred to, the passages 85 will serve as outlet-ports and the passages 86 as inlet-ports.

The construction thus far described is duplicated upon the opposite end of the shaft 1, except that the parallel bars 30 and the spring-actuated dogs or hooks 42 are disposed at right angles to the corresponding parts previously referred to, or in other words one expansible and contractible wheel is set "quartering" to the other, so that the shaft, throughout each entire revolution, is actuated by a positive pressure, which arrangement eradicates or avoids any dead-line in the orbit of rotation.

I will now proceed to describe my improved automatic governor and its connections, whereby the quantity of steam admitted to the cylinder is automatically proportioned to the amount of work to be done.

In Fig. 2 the governor mechanism shows in plan view and at one side of the belt-wheel 2. It is placed in this position, however, only for convenience of illustration, and in practice will be preferably located vertically over the center of the belt-wheel.

Referring to the detail construction, 101 designates a dome, which is continued vertically upward in the form of a tube 102, which in turn terminates in a horizontal table or bearing-plate 103. This dome is mounted rigidly upon or clamped firmly between the similar bars 104, extending parallel with and above the shaft 1, and said bars are bolted rigidly at their opposite ends between the upwardly-converging standards 105. Said standards 105 are bolted at their lower ends, as shown at 106, upon the horizontal arms 13 of the upper portion of the cylinders and are braced apart by the horizontal bars 106ª about midway their height. (See Fig. 1.)

Mounted rigidly upon the upper end of a tube 107, which extends axially through the tube 102 and finds a bearing in the table 103 at the upper end of the same, is a collar 108, which also rests and is adapted to turn upon said table. Said collar is provided at diametrically-opposite points with the outwardly-projecting arms 109, and mounted pivotally upon the same at 110 are the bell-crank levers 111. The longer or pendent arms of said levers carry ordinary governor-balls 112, while the shorter arms, which converge upwardly, are loosely mounted in the link 113. Said link in turn is pivotally mounted between the collar 114 and the cap 115 upon the vertical rod 116, which rod extends centrally through the tube 107 and is rigidly connected, as at 117 or in any other suitable manner, to the bar 118. Said bar 118 extends parallel with and is about equal in length to the shaft 1, and has its opposite ends reduced to form cylindrical spindles 119, which project through the slotted links 120, and said links are held upon said rods by the collars or nuts 121, which are mounted upon said bar. Said links in turn are pivotally connected at their ends, as at 122, by the link-rods 123 to the wrist-pins 50, projecting from the outer faces of the oscillating disks 47, and are also pivotally connected at their middle, as at 124, to the upper ends of the levers 125 of the second class, which are fulcrumed at their middle, as at 126, upon pins projecting outwardly from the brace-bars 106, and said levers 125 are pivotally connected at their lower ends, as at 127, to the middle of the transversely-extending link-bars 128, which are pivotally connected at their opposite ends to the bell-crank levers 129, fulcrumed at or near their angle, as at 130, upon portions of the cylinder-casings. The other arms of said bell-crank levers project inwardly and are pivotally connected, as at 131, to the upper ends of the pendent links 132, and said links are provided with longitudinal slots through which the ends of the levers 96 and 97 project.

One of the bell-crank levers 129 upon one-half of the engine is preferably bent and extended toward and over the notched sector 133, which is bolted or otherwise rigidly secured upon one of the cylinder-casings of the engine as near the center of the same as possible and then continued vertically upward to form the reversing-lever 134. The bell-crank lever of the other part of the engine at the corresponding side of the shaft is also extended toward the fly-wheel, as shown at 135, Fig. 2, and is secured at its ends by rivets or other suitable means, as shown at 136, to the lever 134, so that the operation of said lever will cause the simultaneous operation of the bell-cranks, and therefore of the valve-controlling levers 96 and 97, as will be understood. The reason the reversing-lever 134 is located as nearly as possible in the center of the engine is to equalize the pressure as much as possible upon said bell-crank levers at opposite sides of the same.

137 designates a dog, which is provided with the upper and lower sleeves 138 and 139, embracing loosely the lever. Said dog above the sleeve 138 is bent semicircularly outward from the lever, as shown at 140, and is provided with the lug 141, which engages peripherally the cam-wheel 142, carried by said lever. Said dog is normally held in engagement with one or the other of the notches 143, 144 or 145 of the sector 133 by the expansion-spring 146, which is interposed between and bears at its opposite ends against the sleeve 139 of the dog and the fixed collar 147 of the lever. When the dog is in engagement with the notch 143, the engine is dead or inoperative. When it is in engagement with the notch 144 the piston is rotating in the direction indicated by the arrow, Fig. 1, and when it is in engagement with the notch 145 the piston is rotating in the opposite direction. To disengage the dog from either of said notches the upper ends of the lever and dog are grasped and pressure applied, which causes the lug 141 to ride upwardly upon the cam-wheel 142, to overcome the pressure or resistance of the spring 146 and raise the dog. Immediately the pressure upon said lever and dog is released the spring throws it back to its original position and into engagement with the first notch with which it registers.

In order to transmit motion to the governor the grooved pulleys 148 and 149 are mounted rigidly upon the shaft near the belt-wheel and upon the lower end of the tube, respectively. Said pulleys of course rotate in planes at right angles to one another, and arranged parallel with each other, and rotatably supported in any suitable manner, so that their grooves shall register with the vertical plane of the groove of the pulley 148 and with the horizontal plane of the groove of the pulley 149, are the guide-pulleys 150. An endless belt or cable 151 connects said pulleys 148 and 149, and is guided around said pulleys 150, as shown in Figs. 1 and 2. Therefore it will be readily seen that the rotation of the shaft causes the governor to rotate at corresponding speed, owing to the fact that the pulleys 148 and 149 are of equal diameter. It will be also noticed that this governor utilizes the weight of the parts operatively connected to the same to assist the balls to spread; in other words, works with the gravitation of the parts, in contradistinction to the Corliss governor, which works against gravitation, so that my governor will expand, if anything, more quickly to changes in the load of the engine.

The operation of the engine is as follows: Supposing it to have stopped with one of the rotary pistons on "dead-center," as shown in Fig. 3, the engine is started to rotate in the direction indicated by the arrow, Fig. 1, by properly manipulating the reversing-lever to cause the spring-actuated dog to engage the notch 144, and thereby simultaneously operate the valves and cause their discharge-ports to register with the ports 85 (inlet-ports in this instance) of the passages or channels 18 and 19. By throwing the reversing-lever to the position referred to the oscillatory disks and the links 120, together with their connecting parts, are caused to assume the position shown in Fig. 13, where it will be noticed that the bar 118, connected to the vertical rod 116 of the governor, is in engagement with the slotted links 120 at one end, for a purpose which will presently appear. The steam enters said passages and causes instantly the rotation of the pistons, because when one of them is on dead-center the other, being set quartering, has its followers or paddles in the position shown in dotted lines, Fig. 3, and as said piston continues to rotate the exhaust-steam escapes by way of the ports 86, (discharge-ports in this instance,) the circular passage 84 (or parts of the same) and the passages 85ª, from which it passes in the direction indicated by the arrows, Fig. 3, through the passage 86ª and the exhaust-pipe 87. That portion of the governor comprising the tube 107, the collar 108, the weighted levers 111, and the connecting-links 113 in the meantime rotates at the same speed as the pistons of the engine, owing to the endless belt or cable connection hereinbefore described. Supposing now that the speed of rotation of the engine is increased beyond the uniform rate of speed required, by reason of the belt (not shown) slipping upon the pulley or the load of the engine being lightened from any other cause, the governor will instantly respond by a greater divergence of the governor-balls 112, therefore causing the pivotal operation of the levers 111 in a vertical plane and causing, consequently, a downward movement of the link 113 and the rod 116 connected thereto. This downward movement of the rod in turn depresses the elevated ends of the links 120 in the direction indicated by the arrow, Fig. 13, and causes consequently a slight oscillatory movement of the disks 47 in the direction indicated by the arrow $a$, Fig. 1.

As will be understood from the foregoing description, the wheel 32, when the engine is running at a uniform rate of speed, is expanded and contracted twice in each revolution, these expansions and contractions taking place as the arms 25ª of the followers or paddles are forced outwardly alternately by the action of the springs 25ᶜ and forced inward by the action of the cam-rollers 88, as the followers or paddles pass the bridge between the ports leading to and from the passages 18 and 19, and therefore it will be understood that as the engine is proportioned to cause the rollers upon the inner ends of the dogs or hooks, when the wheel 32 is expanded, to be in the same radius as the trip-rollers 46, said dog-rollers will approach the approaching trip-rollers 46 and 46ª (this approach of the trip-rollers being caused by the oscillatory movement of the disks in the direction opposite to the rotation of said wheel, as hereinbefore explained) and will be tripped by the same to cause the instantaneous disengagement of said dogs or hooks with the arms 25ª of the spring-actuated followers or paddles and the intermediate and consequent collapse or retraction of said wheel, which continues in this collapsed condition until it is again expanded by the re-engagement of the arms 25ª of the followers or paddles with the dogs 42 as they are forced outwardly by the springs 25ᶜ in passing the bridges, with which they next come into engagement.

Thus it will be understood that accordingly as the speed of the governor varies the trip-rollers 46 and 46ª, which are the "laborers" when the engine is running in the direction indicated by the feathered arrow, will oscillate back and forth within the speed limit of the engine, which is represented by the position of the trip-rollers 46 and 46ª in Fig. 13.

By reference to Figs. 1 and 13 it will be seen that the oscillatory disk has a movement of nearly forty-five degrees and that when the dogs are tripped by the rollers when occupying the position shown in Fig. 13 the engine will be running at the limit of its speed, because the valve-levers 96 and 97 will be moved to the positions shown in dotted lines by the shoulders $v$ and $v'$, respectively, of the wheel 32 as it expands (see Fig. 4) and will be held in such dotted position and with the discharge-ports of the valves registering with the inlet-ports 85 and supplying steam to the passages 18 and 19 until the antifriction-rollers 44 of said dogs have traveled nearly forty-five degrees and are tripped by the rollers 46 and 46ª. This causes the immediate collapse or retraction of the wheel, and consequently releases said valve-levers 96 and 97, when the springs 94 and 95 (see Fig. 6) return them to their original position, as shown in full lines in the drawings. Now it will be understood clearly that as the speed of the governor increases and causes more or less depression of the elevated end of the slotted links 120, and consequently more or less movement of the oscillatory disk 47 in the direction opposite to the rotation of the wheel 32, the distance to be traveled between the trip-rollers and dog-rollers is shortened, and consequently said dog-rollers are tripped by the trip-rollers sooner than would be the case when the engine was running at a lower speed, and consequently as the immediate collapse of the wheel 32 takes place the supply of steam is cut off more quickly from the followers of the paddles and a smaller quantity of steam is admitted to the cylinder, and the speed of the engine is reduced in a corresponding degree. When the "dog" of the reversing-lever is in engagement with the notch 144, the link 132 on the corresponding side of the engine is raised and the companion link 132 on the opposite side is lowered to prevent any possibility of the accidental reversement of the engine by limiting the rise and fall of the valve-levers 96 and 97. When it is desired to reverse the engine, however, the lever is manipulated to cause the dog to enter the notch 145, and therefore to prevent the rise and fall of the levers 96 and 97, respectively, below a horizontal plane, and also to reverse the position of the parts shown in Fig. 13—that is, to elevate the ends of the links 120, shown depressed in said figure—and to cause a corresponding change of position of the disk 47, which will now by the increased speed of the governor cause the other set of trip-rollers, 49 and 49$^a$, (the laborers in this instance,) to approach the oppositely-rotating wheel 32, said wheel rotating in said opposite direction because the ports 86 are the inlets and the ports 85 the outlets under this new dispensation, wherein the shoulders $w$ and $w'$ elevate and depress the levers 97 and 96, respectively, and cause the "discharge" of the valve to register with the ports 86 (to drive the engine in the opposite direction) and the exhaust-steam to escape through the ports 85. The trip-rollers 49 and 49$^a$ are the "idlers" when the engine is running in the direction first described, performing no function because located at an angle of forty-five degrees rearward of the laborers 46 and 46$^a$. The wheel 32 collapses before they can come in contact with the dog-rollers, and the same is true regarding the trip-rollers 46 and 46$^a$ when the engine is running in the opposite direction.

From the foregoing it is apparent that when the engine is running at its full capacity the pistons are driven by direct steam-pressure nearly half of each revolution and by steam expansion for the remainder of each revolution, and that accordingly as the speed of the governor is increased the direct steam-pressure is diminished and the steam expansion is increased. It is also obvious, as the two pistons are set quartering to each other, that the engine is running under direct pressure for the greater part of each revolution, if the engine is operating at its full capacity.

Having thus described my invention, what I claim as new, and desire to secure by Letters Patent, is—

1. In a rotary engine, the combination of a suitable casing, a rotary piston therein, (which in conjunction with the casing forms two steam passages or channels) pivot-valves connected to the steam-supply and adapted to discharge into one or the other of said channels, stems projecting from said valves, slotted links engaging said stems, and means to adjust said links whereby one valve may rise and fall back from one of said passages, and the other valve shall synchronously fall to and rise from the other passage, substantially as shown and described.

2. In a rotary engine, the combination of a suitable casing, a rotary piston therein and forming in conjunction with the casing two steam passages or channels, pivot-valves mounted in the casing and provided with steam-inlet and steam-discharge ports, stems projecting from said valves, means to cause said stems to operate synchronously, each to cause its discharge-port to register with one of said steam passages or channels, springs engaging said stems to cause the valves to assume their inoperative positions immediately the overcoming pressure is removed, and slotted links engaging said stems and arranged to permit one stem to move or reciprocate above a certain plane, and the other to move or reciprocate below a certain plane synchronously, substantially as shown and described.

3. In a rotary engine, the combination of a casing, a rotary piston therein, and forming with the casing two steam passages or channels, pivot-valves having stems, slotted links engaging the same, an expansive and contractive wheel upon the piston-shaft, an oscillatory disk to cause the retraction of said wheel at times, linked to said slotted links, and means to reverse the position of said links and readjust said disk, that the direction of rotation of said piston may be reversed also, substantially as shown and described.

4. In a rotary engine, the combination of a casing, a rotary piston therein, and forming with the casing two steam passages or channels, pivot-valves having stems, a wheel mounted upon the piston-shaft, devices for expanding such wheel to cause it to operate said valve, and a governor to regulate the length of time such wheel is expanded and thereby the supply of steam to the engine.

5. In a rotary engine, the combination of a casing, a rotary piston therein and forming with the casing two steam passages or channels, pivot-valves having stems, a wheel mounted upon the piston-shaft, devices for expanding said wheel at times, an oscillatory disk for tripping said devices, and means to contract the wheel immediately said devices are tripped, substantially as shown and described.

6. A rotary engine, comprising a cylinder, bridges projecting into the same at diametrically-opposite points, a shaft extending axially of the cylinder, a circular piston mounted rigidly upon said shaft and provided with spring-actuated followers or paddles which project into the steam passages or channels formed, conjointly, by said cylinder, said piston and said bridges, one of said followers or pistons projecting into one of said passages and the other into the other passage simultaneously, valve-casings which communicate with the exhaust-pipe of the engine, and also communicate with both of said steam passages or channels at opposite sides of said bridges, balanced pivot-valves journaled in said casings so as to form passages around said valves, which when the engine is dead or at rest communicate with both of the ports leading to the contiguous ends of said steam passages or channels, discharge-port tubes carried by said valves and having their outer ends closed by the rear or outer faces of the bridges when the engine is at rest, an expansible and contractible wheel mounted rigidly upon said shaft and provided with diametrically-opposite shoulders, and means to cause said wheel to expand twice in every revolution that said shoulders may successively come in contact with extensions and cause the discharge-port of said valve to communicate twice in every revolution with said steam passages or channels, and means to retract said wheel after each expansion, that said balanced pivoted valves may instantaneously resume their original positions and cut off the supply of steam to said steam passages or channels, substantially as set forth.

7. A rotary engine, comprising a cylinder, bridges projecting into the same at diametrically-opposite points, a shaft extending axially of the cylinder, a circular piston mounted rigidly upon said shaft and provided with spring-actuated followers or paddles which project into the steam passages or channels formed conjointly by said cylinder, said piston and said bridges, one of said followers or paddles projecting into one of said passages and the other into the other passage simultaneously, valve-casings which communicate with the exhaust-pipe of the engine, and also communicate with both of said steam passages or channels at opposite sides of said bridges, balanced pivoted valves journaled in said casings so as to form passages around said valves, which when the engine is dead or at rest communicate with both of the ports leading to the contiguous ends of the steam passages or channels, discharge-port tubes carried by said valves and having their outer ends closed by the rear or outer faces of the bridges when the engine is at rest, an expansible and contractible wheel mounted rigidly upon said shaft and provided with diametrically-opposite shoulders, means to cause said wheel to expand twice in every revolution that said shoulders may successively come in contact with an extension and cause the discharge-ports of said valves to communicate twice in every revolution with said steam passages or channels a governor geared to and operating with the shaft, and operative connections between said governor and said expanded wheel whereby the latter is caused to retract at different points in different revolutions, according as the speed of the engine is increased or diminished, to permit the balanced valve to resume the original or normal positions and cut off the supply of steam to said passages or channels immediately the retraction of said wheel takes place, substantially as set forth.

8. A rotary engine, comprising a cylinder, bridges projecting therein, a shaft, a circular piston thereon, which forms, in conjunction with said cylinder and said bridges, a pair of independent steam passages or channels, a pivoted valve at the outer side of each bridge and located within its casing in such manner that a space surrounds it; said passages each communicating with a pair of steam-ports communicating with the contiguous ends of said steam passages or channels at opposite sides of the bridges, a lever projecting from the stem of each valve, springs bearing against the upper and lower sides of said levers, so as to balance the valve in its position of rest, or with its discharge-port closed and its outer end at the rear or outer side of said bridge, followers or paddles carried by and extending radially of the circular piston and provided with arms projecting therefrom, a wheel mounted rigidly upon the shaft, and provided with diametrically-opposite shoulders, dogs pivoted to said wheel, springs holding said dogs into engagement with the arms of said followers or paddles at times, an oscillatory disk having its axis in alignment with the axis of the shaft, provided with trip-rollers, a governor, and operative connections between the same and said oscillatory disk, whereby the latter is oscillated in the direction opposite to the rotation of the shaft when the speed of the engine is increased, and in the opposite direction when the speed of the engine is diminished, and springs bearing against said followers or paddles and tending to force them outward at all times, substantially as set forth.

9. A rotary engine, comprising a cylinder, bridges projecting therein at diametrically-opposite points, a shaft extending axially of said cylinder, a circular piston mounted thereon and forming, in conjunction with said cylinder and said bridges, a pair of separate and independent steam passages or channels, followers or paddles carried by said piston, valve-casings, pivoted valves journaled therein and of diameter to form surrounding passages which communicate with ports in turn communicating with said steam passages or channels at opposite sides of said bridges, and springs normally holding said valves balanced, or in their position of rest, substantially as set forth.

10. A rotary engine, comprising a cylinder, bridges projecting into said cylinder, a shaft, a circular piston mounted thereon and forming, in conjunction with said cylinder and said bridges, a pair of separate and independent steam passages or channels, valve-casings communicating with said passages or channels at opposite sides of said bridges and also communicating with the exhaust-pipe of the engine, balanced valves journaled in said casings, and provided with inlet-ports which communicate with the steam-supply, and with discharge-ports which normally are closed by the rear faces of said bridges, and provided with levers or arms which when horizontal indicate the balanced or inoperative position of the valves, a wheel carried by the shaft, which is provided with shoulders adapted to simultaneously lift the arm or lever of one valve and depress the arm or lever of the other valve, and means to prevent said levers, and consequently said valves, from swinging beyond their normal or inoperative position when released by said wheel.

11. In a rotary engine, the combination of a casing, a rotary piston therein and forming with the casing two steam passages or channels, pivot-valves having stems, a wheel mounted upon the piston-shaft, devices for expanding such wheel, an oscillatory disk for tripping said devices, and a governor to regulate the movements of said disk and thereby the supply of steam to the engine.

12. In a rotary engine, the combination of a casing, a rotary piston therein forming with the casing two steam passages or channels, pivot-valves having stems, a wheel mounted upon the piston-shaft, devices for expanding such wheel, an oscillatory disk provided with trip-rollers to contact with and trip such devices, and springs to contract said wheel when the said devices are tripped, substantially as described.

13. In a rotary engine, the combination of a casing, a rotary piston therein, and forming with the casing two steam passages or channels, pivot-valves having stems, a wheel mounted upon the piston-shaft, dogs carried by said wheel, spring-actuated followers or paddles of the piston provided with arms which engage said dogs and thereby expand said wheel, means to trip said dogs, and springs to contract said wheel, substantially as set forth.

14. A rotary engine, comprising a cylinder, bridges projecting into the same, a shaft, a piston mounted rigidly upon said shaft and forming, in conjunction with the cylinder and the bridges, a pair of steam passages or channels, valve-casings communicating through ports at opposite sides of said bridges with steam passages or channels and also with the exhaust-pipe of the engine, hollow castings which communicate with the steam-supply bolted to the valve-casings, tubular caps adjustably mounted in said castings, skeleton thimbles also mounted in said castings, packing-rings interposed between said skeleton thimbles and said adjustable caps, and between said skeleton thimbles and the valve-casings, valves, comprising cylindrical hollow body portions provided with discharge-ports, tubular stems which are journaled in said valve-casings, said adjustable caps and said interposed thimbles and packing-rings, provided with inlet-ports communicating with the steam-supply, and stems projecting from the opposite end of the body portion and suitably journaled, disks mounted rigidly thereon, provided with outwardly-projecting lugs, levers or arms longitudinally adjustable upon said disks and projecting oppositely from said lugs, casings surrounding said disks, springs carried thereby and exerting pressure upon the opposite sides of said lugs to hold the valves in their inoperative positions, a governor, and operative connections between the same and said valve-levers, whereby the latter are pivotally operated in one direction or the other, substantially as set forth.

15. In a rotary engine, the combination of a casing, a rotary piston therein and forming with the casing two steam passages or channels, pivot-valves having stems, a wheel mounted upon the piston-shaft, dogs carried by said wheel, spring-actuated followers or paddles of the piston provided with arms which engage said dogs and thereby expand said wheel, means to trip said dogs, springs to contract said wheel to release the valve-stems, and springs engaging said stems to return them immediately to their original or inoperative position when released, substantially as set forth.

16. In a rotary engine, the combination of a casing, a rotary piston therein and forming with the casing two steam passages or channels, balanced pivot-valves having stems, a wheel mounted upon the piston-shaft, dogs carried by said wheel, spring-actuated followers or paddles of the piston, provided with arms which engage said dogs and thereby expand said wheel, an oscillatory disk provided with rollers, a governor to control the range or movement of said disk and thereby cause the same by tripping said dogs to regulate the amount of steam entering the engine, substantially as set forth.

17. In a rotary engine, the combination of a casing, a rotary piston therein and forming with the casing two steam passages or channels, pivot-valves having stems, a wheel mounted upon the piston-shaft and concaved at diametrically-opposite points in its periphery to form shoulders, spring-actuated followers or paddles of the piston, provided with arms which expand said wheel and cause one set of said shoulders to strike the stems and operate said valves, and means to cause the contraction of said wheel and its consequent disengagement from said valve-stems, and means to cause the valves immediately thereupon to resume their original or inoperative positions, substantially as set forth.

18. In a rotary engine, the combination of a casing, a rotary piston therein and forming with the casing two steam passages or channels, balanced pivot-valves having stems, and expansible and contractible wheel mounted rigidly upon the piston-shaft, and consisting of two sections held yieldingly together, and means to cause the expansion of said wheel by the separation of said sections that it may engage the stems and operate said valves, and 19. In a rotary engine, the combination of a casing, a rotary piston therein and forming with the casing two steam passages or channels, pivot-valves having stems, and an expansible and contractible wheel to engage said stems and operate said valves, and consisting of a grooved cross-head secured rigidly upon the piston-shaft, a pair of approximately semicircular sections concaved in their peripheries, and provided with inwardly-projecting parallel arms which engage said grooved cross-head, and springs holding said sections yieldingly together, and means for causing the expansion and contraction of said wheel at times, substantially as shown and for the purpose described.

20. In a rotary engine, the combination of a casing, a rotary piston therein and forming with the casing two steam passages or channels, pivot-valves therein to communicate with either of said passages, stems projecting from said valves, a wheel upon the piston-shaft, devices for expanding the same, an oscillatory disk, and means for changing its position of adjustment to accommodate the reverse movement of the engine, substantially as set forth.

21. In a rotary engine, the combination of a casing, a rotary piston therein and forming with the casing two steam passages or channels, balanced pivot-valves therein which communicate with either of said passages or channels, stems projecting from said valves, a wheel upon the piston-shaft, devices for expanding the same, an oscillatory disk, slotted links engaging said stems to limit their movements in certain directions, and means for reversing the positions of said links and for changing the adjustment of said disk in order to reverse the movement of the engine, substantially as set forth.

22. In a rotary engine, the combination of a casing, a rotary piston therein and forming with the casing two steam passages or channels, balanced pivot-valves therein, a wheel mounted upon the piston-shaft, devices for expanding the same, an oscillatory disk to trip said devices at times, a link, links pivotally connecting the same with the disk to cause the latter to oscillate, a governor to operate said link, and thereby cause the disk to trip the said devices, and means to immediately contract said wheel, substantially as and for the purpose set forth.

23. In a rotary engine, the combination of a casing, a rotary piston therein and forming with the casing two steam passages or channels, balanced pivot-valves therein, a wheel mounted upon the piston-shaft, devices for expanding the same, an oscillatory disk to trip said devices at times, a rocking link pivotally linked to said disk, a lever connected to said link, slotted links engaging the stems of said valves and pivotally linked to said lever, and means for synchronously changing the positions of the slotted links, which cause, respectively, the reversal of the valves, (or in other words, to cause each valve to discharge into the passage or channel formerly in communication with the other,) and of the said lever, and thereby of said link and disk, that the latter may oppose and trip the devices for holding the wheel expanded.

24. In a rotary engine, the combination of a casing, a rotary piston therein and forming with the casing two steam passages or channels, balanced pivot-valves therein, a wheel mounted upon the piston-shaft, devices for expanding the same, an oscillatory disk to trip said devices at times, an inclined slotted link pivotally linked to said disk, a governor operatively connected to said link, and constantly changing the inclination thereof by rocking it accordingly as the speed increases or diminishes, a lever pivotally connected to said slotted and inclined link, slotted links embracing extensions or stems of the valves and pivotally linked to said lever, and means to operate said lever and thereby change the positions of said links and the valves, in order that the latter may discharge steam into what was before the discharge ends of the steam passages or channels, and to adjust said slotted link and consequently the oscillatory disk, that the latter may be in a position to properly trip the said expanding devices when the wheel is rotating in the direction opposite to its former movement.

25. In a rotary engine, the combination of a casing, a piston mounted therein and forming with the casing two steam passages or channels, valves communicating with the steam passages or channels, and provided with stems, springs engaging said stems, an expansible and contractible wheel mounted rigidly upon the shaft, provided with a pair of shoulders which successively, in each revolution, overcome the pressure of the springs and cause said valves to pass steam into said steam passages or channels, a governor geared to the piston-shaft, consisting of a turn-table, a pair of weighted levers pivoted thereto, a vertical rod operatively linked to said levers so that it will rise when they fall and fall when they rise, accordingly as the speed of the engine is diminished or increased, a slotted link, a lever pivoted to the framework near its middle and pivotally connected at its upper end to the middle of the slotted link, a bar engaging the slot of said link and carried by the reciprocating rod of the governor, a reversing-lever having an arm to form practically a bell-crank lever, a second or companion bell-crank lever, a bar pivotally connecting said bell-crank levers and pivotally connected to the lower end of the lever fulcrumed near its middle, and slotted links pivotally connected to the other arms of said bell-crank levers, one of them embracing one of the valve-levers to prevent its moving below a horizontal plane, and the other embracing the other valve-lever to prevent its moving above a horizontal plane, when the engine is running in one particular direction, substantially as set forth.

26. In a rotary engine, the combination of a casing provided with internal abutments or bridges, a rotary piston therein and forming with the casing and bridges two independent steam passages or channels, radial spring-advanced followers or paddles forming part of said piston, arms projecting laterally therefrom, balanced pivot-valves provided with stems, a wheel mounted on the piston-shaft, spring-actuated dogs carried thereby and engaging the arms of said followers to expand said wheel, means to trip said dogs at times, and rollers secured to the engine to repress the spring-actuated followers or paddles, in order that they may pass the said bridges and may be re-engaged by the dogs of the expansible wheel.

In testimony whereof I affix my signature in presence of two witnesses.

ISAAC R. KERN.

Witnesses:
G. Y. THORPE,
M. R. REMLEY.